US008561073B2

(12) United States Patent
Gopalan et al.

(10) Patent No.: US 8,561,073 B2
(45) Date of Patent: Oct. 15, 2013

(54) MANAGING THREAD AFFINITY ON MULTI-CORE PROCESSORS

(75) Inventors: Yadhu Nandh Gopalan, Issaquah, WA (US); John Mark Miller, Redmond, WA (US); Bor-Ming Hsieh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1083 days.

(21) Appl. No.: 12/234,316

(22) Filed: Sep. 19, 2008

(65) Prior Publication Data

US 2010/0077185 A1 Mar. 25, 2010

(51) Int. Cl.
*G06F 9/46* (2006.01)
(52) U.S. Cl.
USPC .............. 718/102; 718/100; 712/28; 712/29; 712/30; 712/31
(58) Field of Classification Search
None
See application file for complete search history.

(56) References Cited

U.S. PATENT DOCUMENTS

| 6,269,390 B1 | 7/2001 | Boland |
| 6,289,369 B1 * | 9/2001 | Sundaresan .................. 718/103 |
| 2005/0154860 A1 | 7/2005 | Arimilli et al. |
| 2006/0184296 A1 | 8/2006 | Voeller et al. |
| 2007/0150895 A1 | 6/2007 | Kurland |
| 2008/0133885 A1 | 6/2008 | Glew |
| 2008/0162745 A1 * | 7/2008 | Tkacik et al. .................. 710/33 |
| 2008/0172668 A1 | 7/2008 | Tzruya |
| 2009/0187909 A1 * | 7/2009 | Russell et al. ................ 718/102 |

OTHER PUBLICATIONS

"Easing the Transition to Multi-Core Processors", Multi Core Design, Information Quarterly, vol. 5, No. 4, 2006, pp. 34-37.
Milton, Scott, "Thread Migration in Distributed Memory Multicomputers", TR-CS-98-01, Date: Feb. 1998, 14 Pages.
"Hyperthreading Technology and Digital Multimedia", http://www.newmobilecomputing.com/story/2962/Hyperthreading_Technology_and_Digital_Multimedia/page3/, Mar. 2003.

* cited by examiner

*Primary Examiner* — Emerson Puente
*Assistant Examiner* — Sisley Kim

(57) ABSTRACT

Embodiments of the invention intelligently associate processes with core processors in a multi-core processor. The core processors are asymmetrical in that the core processors support different features or provide different resources. The features or resources are published by the core processors or otherwise identified (e.g., via a query). Responsive to a request to execute an instruction associated with a thread, one of the core processors is selected based on the resource or feature supporting execution of the instruction. The thread is assigned to the selected core processor such that the selected core processor executes the instruction and subsequent instructions from the assigned thread. In some embodiments, the resource or feature is emulated until an activity limit is reached upon which the thread assignment occurs.

20 Claims, 6 Drawing Sheets

MANAGING THREAD AFFINITY ON MULTI-CORE PROCESSORS

BACKGROUND

Multi-core processors have multiple processing units on a single integrated circuit. In some existing systems, the processing units, or cores, are symmetrical in that all the cores have identical configurations or support identical features. In other existing systems, the cores are slightly asymmetrical in that each core may have a different configuration. For example, one core may have a floating-point co-processor while another core does not have such a co-processor. The asymmetrical design enables manufacturers to reduce the cost and size of the multi-core processors.

Developers of existing multi-core processing systems assign processes to particular cores in a static, hardcoded way. For systems with slightly asymmetrical cores, the existing methods of assigning processes to cores result in unbalanced task loading of the cores, varying power consumption of the cores, and irregular responsiveness of the cores, among other inefficiencies.

SUMMARY

Embodiments of the invention manage thread execution on multi-core processors having slightly asymmetrical cores. Resources or features of the core processors are identified. A request to execute an instruction associated with a thread is received. The instruction corresponds to at least one of the identified resources. One of the core processors is selected based on the corresponding resource to execute the instruction. The thread is assigned to the selected core processor such that the selected core processor executes the instruction and subsequent instructions from the assigned thread.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
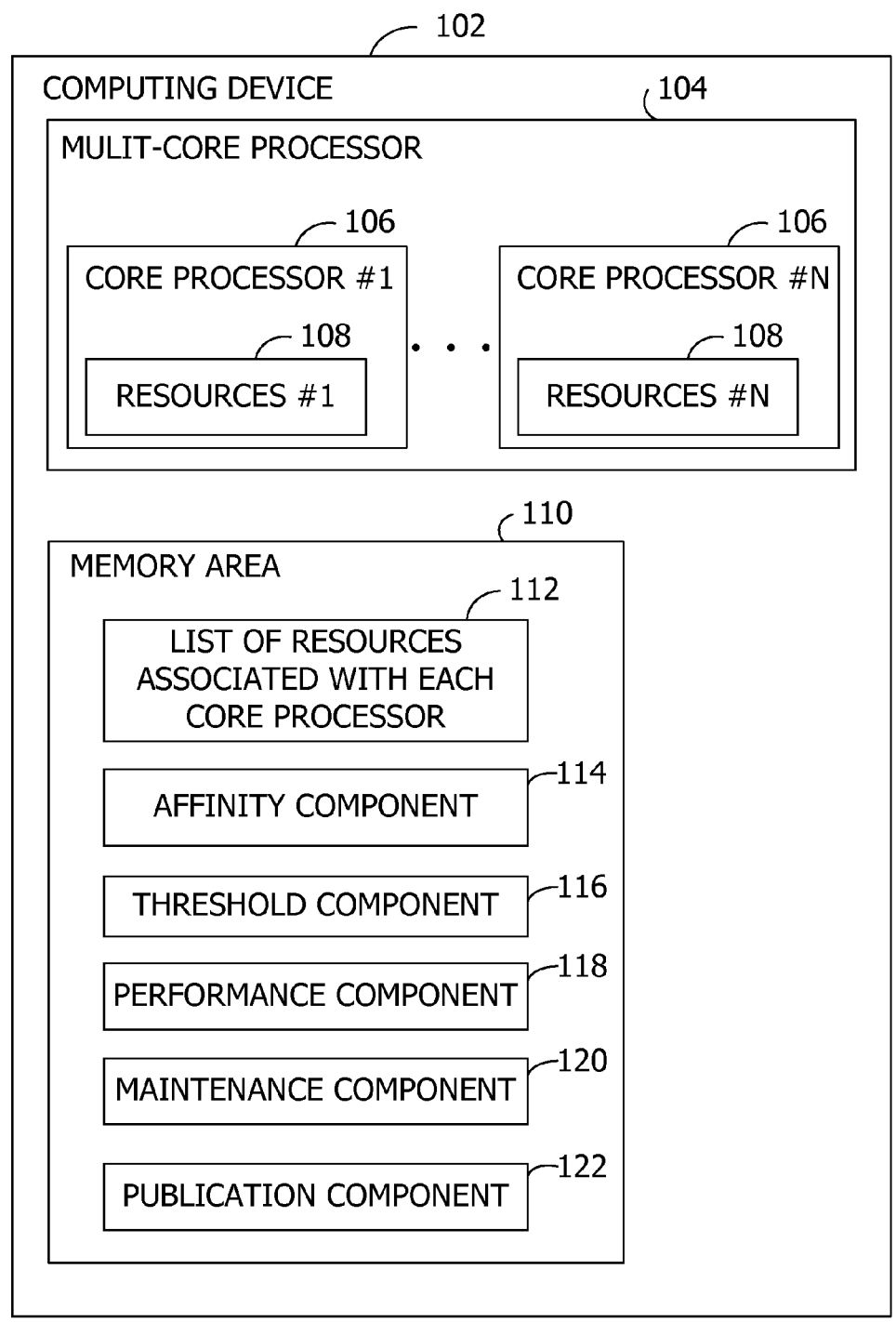
FIG. 1 is an exemplary block diagram illustrating a computing device having a multi-core processor and a memory area.

Embodiments of the invention provide a computing device 102 having a multi-core processor 104 such as shown in FIG. 1. The multi-core processor 104 includes a plurality of core processors 106, such as core processor #1 through core processor #N where N is a positive integer. The computing device 102 optimizes execution of the threads by aligning, assigning, or otherwise associating each of the threads with one of the core processors 106. Each of the core processors 106 supports resources 108 or features, and each might have a configuration that differs from one or more of the other core processors 106. For example, one of the core processors 106 may support floating-point operations while another core processor lacks such support. In another example, one of the core processors 106 may have a different processor frequency or clock speed from another one of the core processors 106. In yet another example, the core processors 106 have different power consumption or available caches such as caches 204 in FIG. 2. As such, aspects of the invention are operable with core processors 106 that are considered asymmetrical, or slightly asymmetrical. For example, the core processors 106 share the same instruction set, but are tuned or configured differently.

The computing device 102 also has access to a memory area 110. The memory area 110 may be internal to the computing device 102 as shown in FIG. 1, or external to the computing device 102 (not shown). The memory area 110 stores a list 112 of the resources 108 associated with each of the core processors 106. The list 112 may be generated by querying each of the core processors 106 individually. Alternatively or in addition, the list 112 may be generated by receiving a publication of the resources 108, features, or configuration of each of the core processors 106 from each of the core processors 106. The memory area 110 or other computer-readable medium also stores computer-executable components for implementing aspects of the invention. The components include an affinity component 114, a threshold component 116, a performance component 118, a maintenance component 120, and a publication component 122. These components are described in detail below with reference to FIG. 6.

The computing device 102 includes any device with one or more processing units. While some embodiments of the invention are applicable to a mobile device, aspects of the invention are operable with other computing devices. For example, these other computing devices include, but are not limited to, personal computers, server computers, digital cameras, portable music players, gaming consoles, hand-held or laptop devices, multiprocessor systems, microprocessor-based systems, set top boxes, programmable consumer electronics, network computers, minicomputers, mainframe computers, and distributed computing environments that include any of the above systems or devices, and the like.

In an embodiment, the multi-core processor 104 is transformed into a special purpose microprocessor by executing computer-executable instructions or by otherwise being programmed. For example, the multi-core processor 104 executes computer-executable instructions for performing the operations illustrated and described below with reference to FIG. 4, FIG. 5, and FIG. 6.

Figure 2:
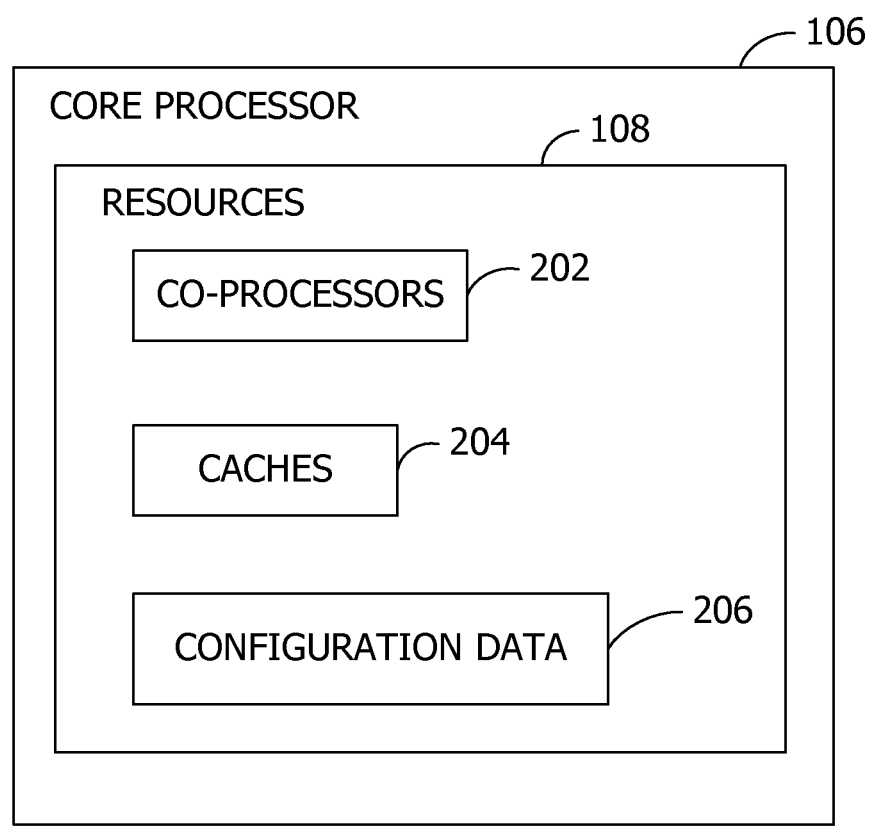
FIG. 2 is an exemplary block diagram illustrating a core processor and resources supported by the core processor.

Referring next to FIG. 2, an exemplary block diagram illustrates the core processor and resources 108 supported by the core processor. The resources 108 include, for example, co-processors 202 such as floating-point units or digital signal processors, caches 204 such as an L1 cache, or configuration data 206 such as a processor frequency or clock speed. The co-processors 202 are directed to, but not limited to, special-purpose operations such as for graphics rendering, image processing, encryption, and floating-point operations.

Figure 3:
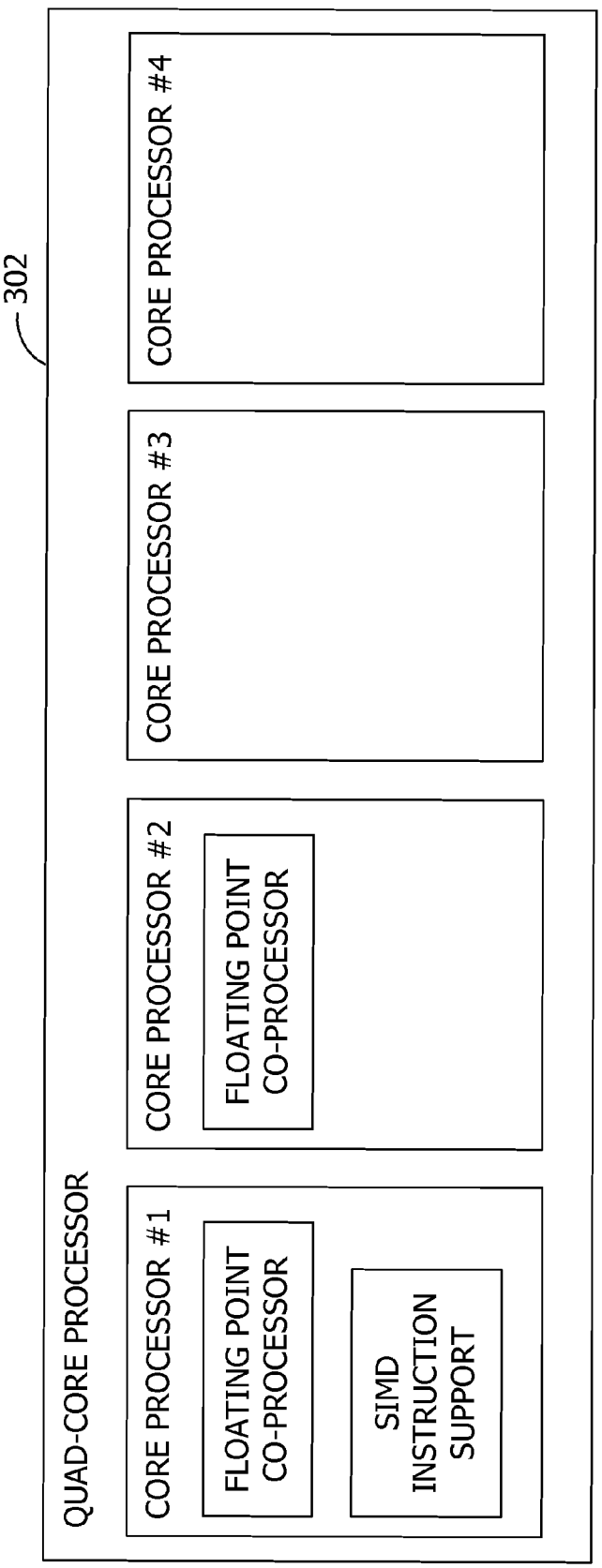
FIG. 3 is an exemplary block diagram illustrating a quad-core processor in which only two core processors include a floating-point co-processor.

Referring next to FIG. 3, an exemplary block diagram illustrates a quad-core processor 302 in which only two core processors include a floating-point co-processor. In the example of FIG. 3, the quad-core processor 302 has four core processors. Only two of the core processors have floating point units, while only one of the core processors has single instruction, multiple data support.

Figure 4:
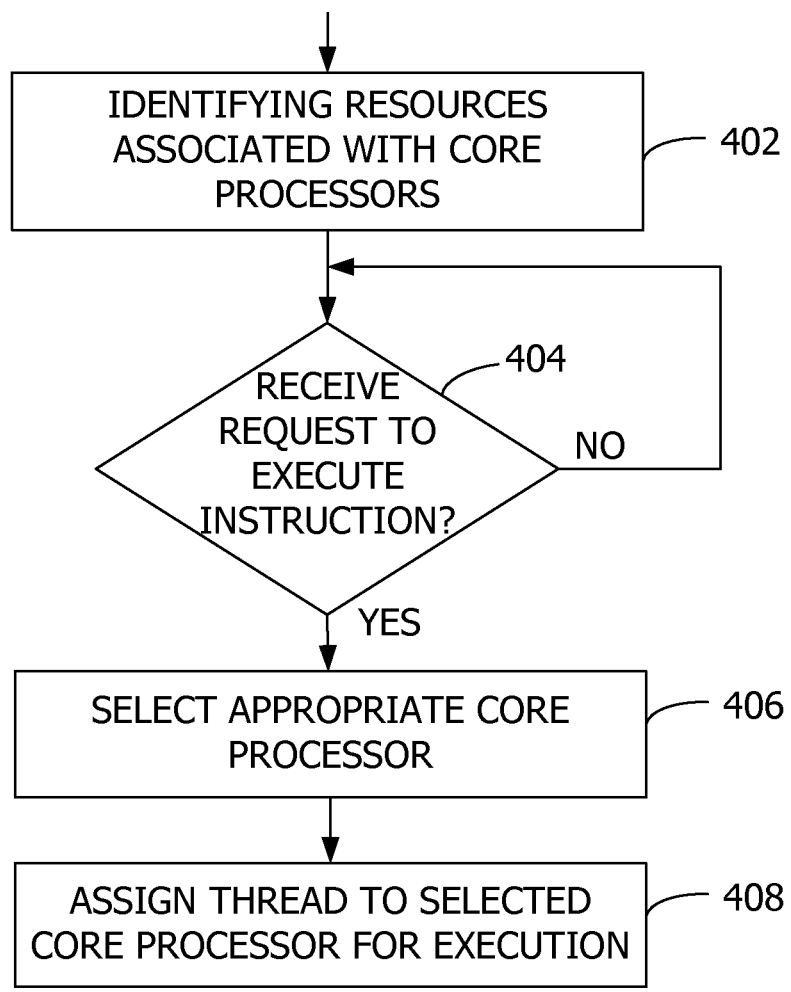
FIG. 4 is an exemplary flow chart illustrating the assignment of threads to core processors based on resources supported by the core processors.

Referring next to FIG. 4, an exemplary flow chart illustrates the assignment of threads to the core processors 106 based on the resources 108 supported by the core processors 106. At 402, the resources 108 associated with each of a plurality of the core processors 106 on the multi-core processor 104 are identified. For example, the core processors 106 may publish the supported resources 108. Alternatively or in addition, the resources 108 may be identified by querying each of the core processors 106 individually to obtain the list 112 of the resources 108, features, configuration data 206, or the like. In an embodiment, a hardware abstraction layer (HAL) application programming interface (API) for an operating system at the kernel level enables the querying. The granularity of the querying is at the core level, as shown in the example API function call GetProcessorCoreInformation (Core, Infotype, Coreinfo), wherein Core represents the core number being queried, Infotype represents the type of information being requested, and Coreinfo represents the information being requested about the core. Examples of the Infotype argument include co-processors, caches, and processor frequency. Examples of the Coreinfo argument for Infotype co-processor include the particular brand of co-processor.

Alternatively or in addition, an application program executing on the computing device 102 queries the underlying multi-core processor 104 to determine whether there is support for some of the instructions coming from the application program. For example, an API function call such as IsProcessorFeaturePresent(Feature) is called by the application program. The function call returns a True or False value. In some embodiments, the function call returns a bit mask of the core processors 106 that support the feature.

Alternatively or in addition, the application program informs the operating system kernel that a thread from the application program will utilized a particular feature. The kernel uses the information to appropriately schedule the thread on the core with the feature. An example API enabling this functionality includes RequestCoreFeature(ThreadId, Feature) where ThreadId is the thread identifier and Feature is the feature requested by the application program for the thread.

If a request to execute an instruction from a thread is received at 404, one of the core processors 106 is selected at 406. The core processor is selected based on the resource 108 corresponding to the instruction. For example, if the instruction includes a floating-point operation, the selected core processor is a core processor having a floating-point co-processor. In some embodiments, the request to execute the instruction is detected by trapping the request via the operating system of the computing device 102.

At 406, the thread is assigned, or otherwise associated with, the selected core processor. For example, an affinity is created between the thread and the selected core processor. Accordingly, the selected core processor executes the instruction and subsequent instructions from the assigned thread. In an embodiment (not shown), the memory area 110 stores the assignment between the thread and the selected core processor.

In embodiments, operations 404, 406, and 408 are performed dynamically during execution of the thread.

Figure 5:
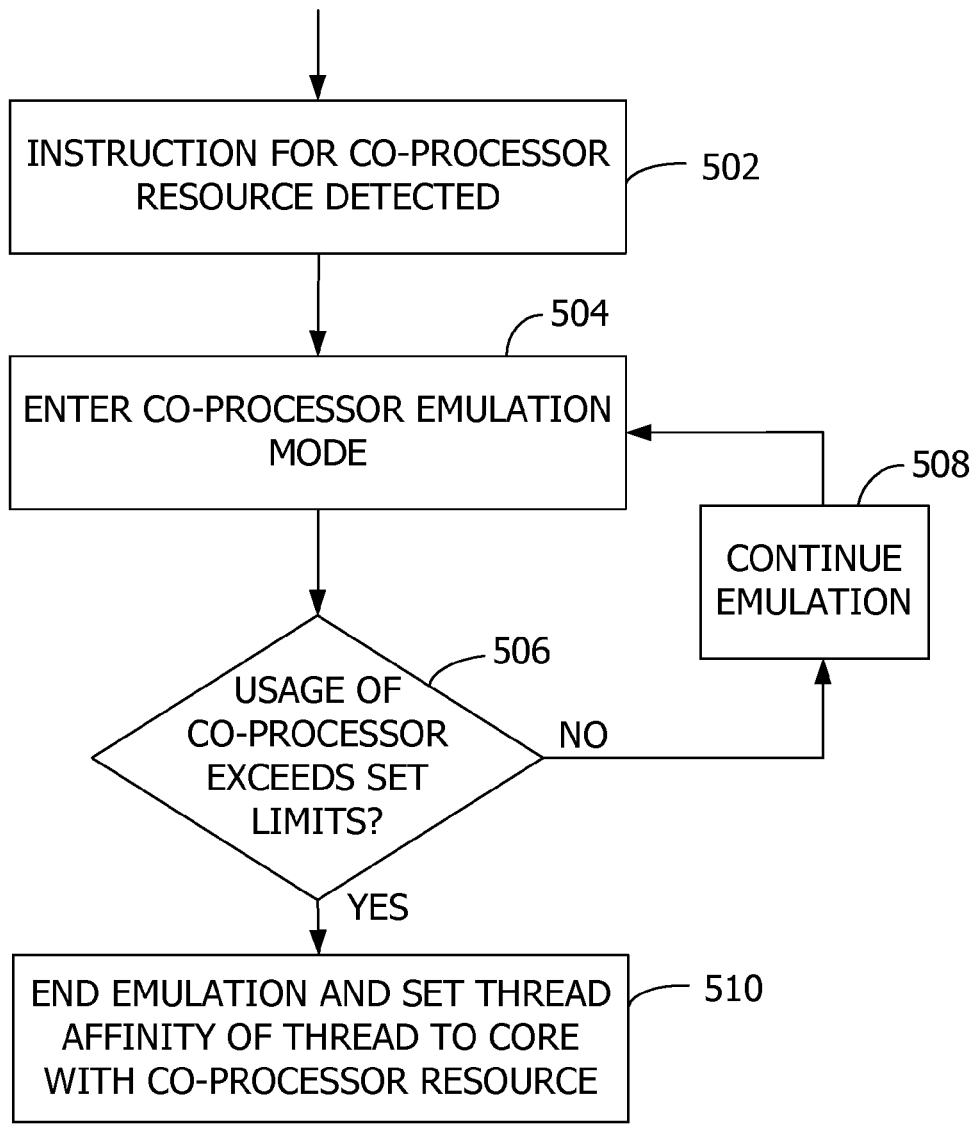
FIG. 5 is an exemplary flow chart illustrating the assignment of threads to core processors after an activity limit has been reached.

Referring next to FIG. 5, an exemplary flow chart illustrates the assignment of threads to the core processors 106 of the multi-core processor 104 after an activity limit has been reached. The activity limit for each of the core processors 106 is defined by a user, developer, or other means. The activity limit is chosen, for example, to maintain a proper load balance among the core processors 106. Alternatively or in addition, the activity limit may be defined at other granularities, such as individual activity limits for each of the co-processors 202 associated with each of the core processors 106. A request to execute an instruction that uses a particular co-processor resource 108 is detected at 502. For example, an operating system on the computing device 102 traps the request from the thread to execute the instruction. The core processor having the co-processor resource 108 is selected, and emulation of the co-processor 202 occurs at 504. That is, after detecting the instruction that uses the resources 108 of a particular core processor 106, the operating system emulates the instruction (and subsequent instructions from the thread) until the usage of the core processor exceeds a set limit as shown in operations 506 and 510.

During execution of the thread, the operating system monitors an activity level or a usage level of the selected core processor. The monitored activity level is compared to the activity limit defined previously. Emulation of the selected core processor continues at 508 so long as the usage of the co-processor 202 does not exceed the activity limit at 506. If the usage of the selected core processor exceeds the defined activity limit at 506, emulation ends and the thread is assigned to the selected core processor having the co-processor resource at 510. The selected core processor executes subsequent instructions from the assigned thread based on the assignment.

Figure 6:
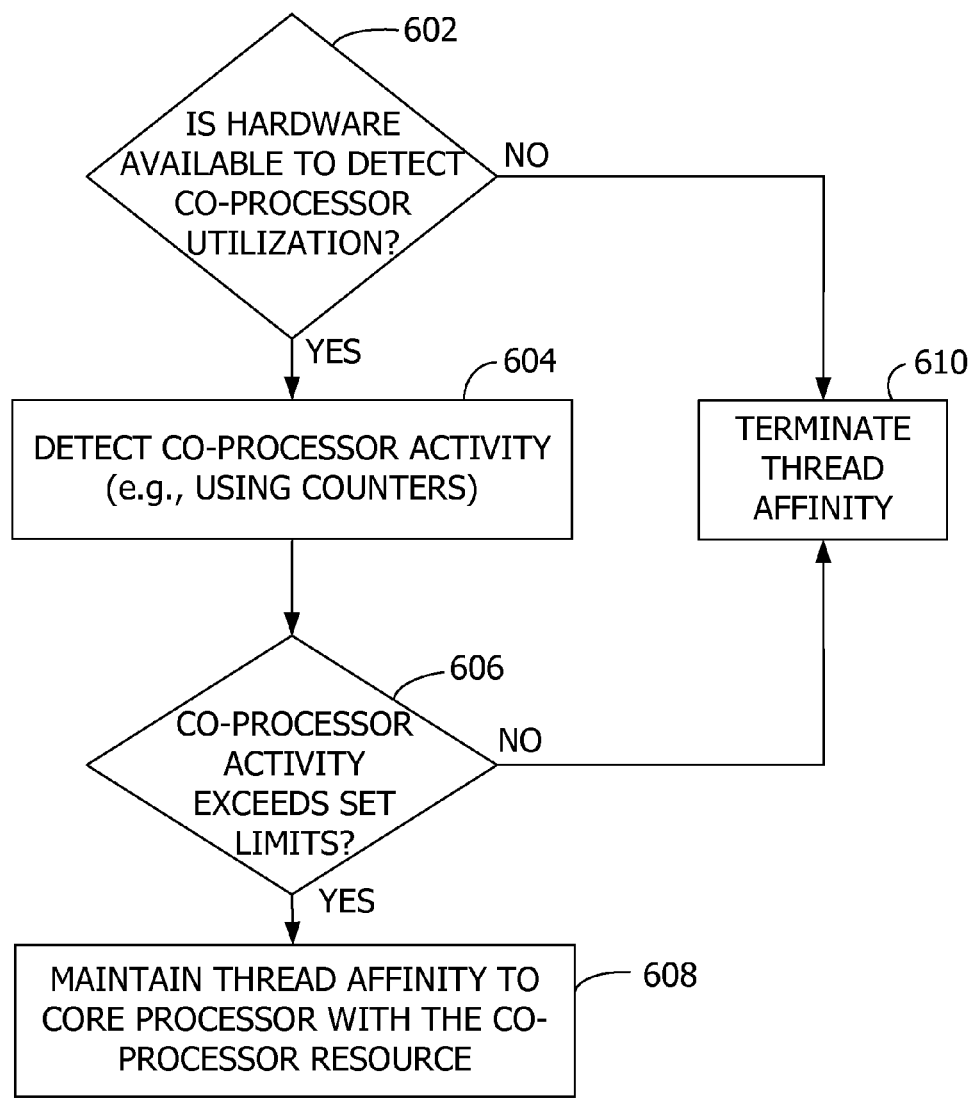
FIG. 6 is an exemplary flow chart illustrating the termination of a thread assignment based on inactivity.

Referring next to FIG. 6, an exemplary flow chart illustrates the termination of a thread assignment based on inactivity. If hardware or other means is not available to detect co-processor utilization at 602, the existing thread assignment or affinity is terminated, removed, deleted, or otherwise undone at 610 such that subsequent instructions from the thread are executed by any of the available core processors 106 in the multi-core processor 104. If the means for detecting co-processor utilization are available at 602, the co-processor activity is monitored or detected at 604. For example, performance counters are used for the monitoring or detection. If the monitored co-processor activity exceeds set limits (e.g., the activity limit) at 606, the thread assignment is maintained at 608. If the monitored co-processor activity does not exceed the activity limit at 606, the thread assignment is terminated at 610.

The operations illustrated in FIG. 6 may be implemented in hardware of the computing device 102 or in the operating system of the computing device 102 by, for example, the components illustrated in FIG. 1. In such an embodiment, the affinity component 114 accesses a defined relationship between each of a plurality of threads and a plurality of the core processors 106 on the multi-core processor 104. The defined relationship is based on resources 108 associated with the plurality of core processors 106. The plurality of threads publishes the resources 108 associated with the instructions by, for example, the publication component 122. Via the defined relationship, the plurality of core processors 106 executes instructions from the plurality of threads based on the defined relationship. The threshold component 116 defines an activity limit for each relationship accessed by the affinity component 114. The performance component 118 (e.g., a co-processor performance counter) monitors usage of the plurality of core processors 106 by the plurality of threads. The maintenance component 120 compares the usage monitored by the performance component 118 to the activity limit for each relationship defined by the threshold component 116.

The maintenance component 120 terminates the relationship for one or more of the threads based on the comparison such that any of the plurality of core processors 106 executes subsequent instructions from the threads responsive to the termination. In some embodiments, the threshold component 116 adjusts the defined activity limit for a terminated relationship responsive to the termination. For example, the activity limit may be set to zero or null.

Exemplary Operating Environment

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for assigning the thread, during execution of the thread, to one of the plurality of core processors 106 based on the resources 108 associated with the core processors 106, and exemplary means for managing assignment of the thread to one of the plurality of core processors 106 based on an activity level of said one of the plurality of core processors 106.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for optimizing thread execution on a mobile computing device having a multi-core processor, said system comprising:
   a memory area on a mobile computing device having a multi-core processor, said memory area storing a list of one or more resources associated with each of a plurality of core processors on the multi-core processor; and
   a processor programmed to:
      define an activity limit for each of the plurality of core processors to maintain a processor load balance among the plurality of core processors;
      receive a request to execute an instruction associated with a thread, said instruction corresponding to at least one of the resources;
      select one of the plurality of core processors based on the corresponding resource;
      emulate execution of the instruction by the selected one of the plurality of core processors;
      monitor an activity level of the selected one of the plurality of core processors, during the emulated execution of the instruction associated with the thread, said activity level representing a processor load on the selected one of the plurality of core processors, said activity level being a function of the emulated execution;
      compare the monitored activity level to the defined activity limit, wherein said comparison comprises:
         continuing the emulated execution of the instruction by the selected one of the plurality of core processors if the monitored activity level of the selected one of the plurality of core processors does not exceed the defined activity limit;
         terminating the emulated execution if the monitored activity level of the selected one of the plurality of core processors exceeds the defined activity limit; and
      assign the thread to the selected one of the plurality of core processors based on the comparison, wherein the selected one of the plurality of core processors executes subsequent instructions from the assigned thread based on the assignment.

2. The system of claim 1, wherein the memory area further stores the assignment between the thread and the selected one of the plurality of core processors.

3. The system of claim 1, wherein the processor is further programmed to assign the thread to the selected one of the plurality of core processors if the monitored activity level exceeds the defined activity limit for the selected one of the plurality of core processors.

4. The system of claim 1, further comprising means for assigning the thread, during execution of the thread, to one of the plurality of core processors based on the resources associated with the core processors.

5. The system of claim 1, further comprising means for managing assignment of the thread to one of the plurality of core processors based on an activity level of said one of the plurality of core processors.

6. A method comprising:
defining an activity limit for each of a plurality of core processors on a multi-core processor to maintain a processor load balance among the plurality of core processors;
querying, by an operating system executing on a computing device, each of the plurality of core processors on the multi-core processor to identify one or more resources associated therewith;
receiving a request to execute an instruction associated with a thread, said instruction corresponding to at least one of the identified resources;
selecting one of the plurality of core processors based on the corresponding resource;
emulating execution of the instruction by the selected one of the plurality of core processors;
monitoring an activity level of the selected one of the plurality of core processors, during the emulated execution of the instruction associated with the thread, said activity level representing a processor load on the selected one of the plurality of core processors, said activity level being a function of the emulated execution;
comparing the monitored activity level to the defined activity limit, wherein said comparison comprises:
continuing the emulated execution of the instruction by the selected one of the plurality of core processors if the monitored activity level of the selected one of the plurality of core processors does not exceed the defined activity limit;
terminating the emulated execution if the monitored activity level of the selected one of the plurality of core processors exceeds the defined activity limit; and
assigning the thread to the selected one of the plurality of core processors based on the comparison, wherein the selected one of the plurality of core processors executes the instruction and subsequent instructions from the assigned thread responsive to said assigning the thread.

7. The method of claim 6, wherein receiving the request comprises detecting the request to execute the instruction.

8. The method of claim 6, wherein the resources comprises co-processors for one or more of the following: graphics rendering, image processing, encryption, and floating point operations.

9. The method of claim 6, wherein assigning the thread comprises creating an affinity between the thread and the selected one of the plurality of core processors such that instructions from the thread are performed by the selected one of the plurality of core processors.

10. The method of claim 6, wherein identifying the one or more resources comprises receiving a publication of the resources from each of the plurality of core processors.

11. The method of claim 6, wherein identifying the one or more resources comprises identifying the one or more resources associated with each of a plurality of asymmetric core processors on a multi-core processor.

12. The method of claim 6, wherein the plurality of core processors are slightly asymmetrical.

13. The method of claim 6, wherein said receiving, said selecting, and said assigning are performed dynamically during execution of the thread.

14. One or more computer storage media storing computer-executable instructions that when executed by one or more processors perform actions comprising:
defining an activity limit for each of a plurality of core processors on a multi-core processor to maintain a processor load balance among the plurality of core processors, each of the plurality of core processors having one or more resources associated therewith;
receiving a request to execute an instruction associated with a thread, said instruction corresponding to at least one of the one or more resources;
selecting one of the plurality of core processors based on the corresponding resource;
emulating execution of the instruction by the selected one of the plurality of core processors;
monitoring an activity level of the selected one of the plurality of core processors, during the emulated execution of the instruction associated with the thread, said activity level representing a processor load on the selected one of the plurality of core processors, said activity level being a function of the emulated execution;
comparing the monitored activity level to the defined activity limit, wherein said comparison comprises:
continuing the emulated execution of the instruction by the selected one of the plurality of core processors if the monitored activity level of the selected one of the plurality of core processors does not exceed the defined activity limit;
terminating the emulated execution if the monitored activity level of the selected one of the plurality of core processors exceeds the defined activity limit; and
assigning the thread to the selected one of the plurality of core processors based on the comparison, wherein the selected one of the plurality of core processors executes the instruction and subsequent instructions from the assigned thread responsive to said assigning the thread.

15. The computer storage media of claim 14, wherein the stored computer-executable instructions when executed by the one or more processors perform further actions comprising: storing the assignment between the thread and the selected one of the plurality of core processors.

16. The computer storage media of claim 14, wherein said receiving, said selecting, and said assigning are performed dynamically during execution of the thread.

17. The computer storage media of claim 14, wherein the stored computer-executable instructions when executed by the one or more processors perform further actions comprising: identifying the one or more resources associated with each of a plurality of asymmetric core processors on a multi-core processor.

18. The computer storage media of claim 14, wherein receiving the request comprises detecting the request to execute the instruction.

19. The computer storage media of claim 14, wherein assigning the thread comprises creating an affinity between the thread and the selected one of the plurality of core processors such that the instruction and the subsequent instructions from the thread are performed by the selected one of the plurality of core processors.

20. The computer storage media of claim 14, wherein the stored computer-executable instructions when executed by the one or more processors perform further actions comprising: receiving a publication of the one or more resources from each of the plurality of core processors.

\* \* \* \* \*